(12) United States Patent
Linssen

(10) Patent No.: US 8,154,522 B2
(45) Date of Patent: Apr. 10, 2012

(54) RECOVERING IMAGE SYSTEM

(75) Inventor: Ronald Marie Willem Linssen, Hoensbroek (NL)

(73) Assignee: Chimei Innolux Corporation, Chu-Nan (TW)

( * ) Notice: Subject to any disclaimer, the term of this patent is extended or adjusted under 35 U.S.C. 154(b) by 1051 days.

(21) Appl. No.: 11/894,217

(22) Filed: Aug. 20, 2007

(65) Prior Publication Data

US 2009/0051663 A1 Feb. 26, 2009

(51) Int. Cl.
*G06F 3/041* (2006.01)

(52) U.S. Cl. .......................................... 345/173

(58) Field of Classification Search ............... 345/173
See application file for complete search history.

(56) References Cited

U.S. PATENT DOCUMENTS

| | | | |
|---|---|---|---|
| 6,922,183 B2* | 7/2005 | Ting et al. ................... | 345/87 |
| 2005/0140634 A1* | 6/2005 | Takatori ....................... | 345/96 |
| 2005/0168434 A1* | 8/2005 | Wang-Yang ................. | 345/103 |
| 2007/0001980 A1* | 1/2007 | Bae ............................. | 345/98 |
| 2007/0013640 A1* | 1/2007 | Lin et al. .................... | 345/100 |

* cited by examiner

*Primary Examiner* — Quan-Zhen Wang
*Assistant Examiner* — Tony Davis
(74) *Attorney, Agent, or Firm* — Liu & Liu

(57) ABSTRACT

The invention relates to a recovering image system comprising a data inputting device, a driver and a panel. The data inputting device outputs digital data signals. The driver device receives the digital data signals, converts the digital data signals to analog data signals, outputs the analog data signals or reset data signals according to timing control signals. The panel receives the analog data signals or the reset data signals and displays normal images, reset images or both according to the analog data signals and the reset data signals. To recover only the disturbed area, feedback of the touch panel to the driver is required.

17 Claims, 4 Drawing Sheets

RECOVERING IMAGE SYSTEM

BACKGROUND OF THE INVENTION

1. Field of the Invention

The invention relates to a recovering image system, and in particular relates to a recovering image system for a LCD panel with touch panel.

2. Description of the Related Art

The MVA (Multi-domain Vertical Alignment) panels have a tendency for showing a domain disturbance for a long period of time after mechanical stress occurs on the touch panel (or MVA panel). Accordingly, it makes the MVA panel less useful for touch panel applications since hand written information leaves undesired traces of push domains by the stylus. As long as the panel is only refreshed, this disturbance will not disappear.

BRIEF SUMMARY OF THE INVENTION

A detailed description is given in the following embodiments with reference to the accompanying drawings.

An embodiment of a recovering image system is provided. The recovering image system comprises a data inputting device, a driver and a panel. The data inputting device outputs digital data signals. The driver device receives the digital data signals, converts the digital data signals into analog data signals, and outputs the analog data signals or resets data signals according to timing control signals. The panel receives the analog data signals or the reset data signals and displays normal images, reset images or both according to the analog data signals and the reset data signals.

Another embodiment of a recovering image system is provided. The recovering image system comprises a data inputting device, a driver and a panel. The driver device comprises a refresh data unit, a AND logic circuit, a timing control unit and a digital to analog converter (DAC). The data inputting device outputs digital data signals. The refresh data unit receives the digital data signal from the data inputting device and outputs serial digital signals. The AND logic circuit receives the serial digital signals and the timing control signals to output logic circuit signals. The timing control unit outputs the timing control signals according to a reset enable signal and a reset rate signal. The digital to analog converter converts the logic circuit signals into the analog data signals or the reset data signals according to the timing control signals. The panel receives the analog data signals or the reset data signals to display normal images, reset images or both according to the analog data signals and the reset data signals. When the driver device outputs the reset data signals, the panel displays the reset images. When the driver device outputs the analog data signals, the panel displays the normal images.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
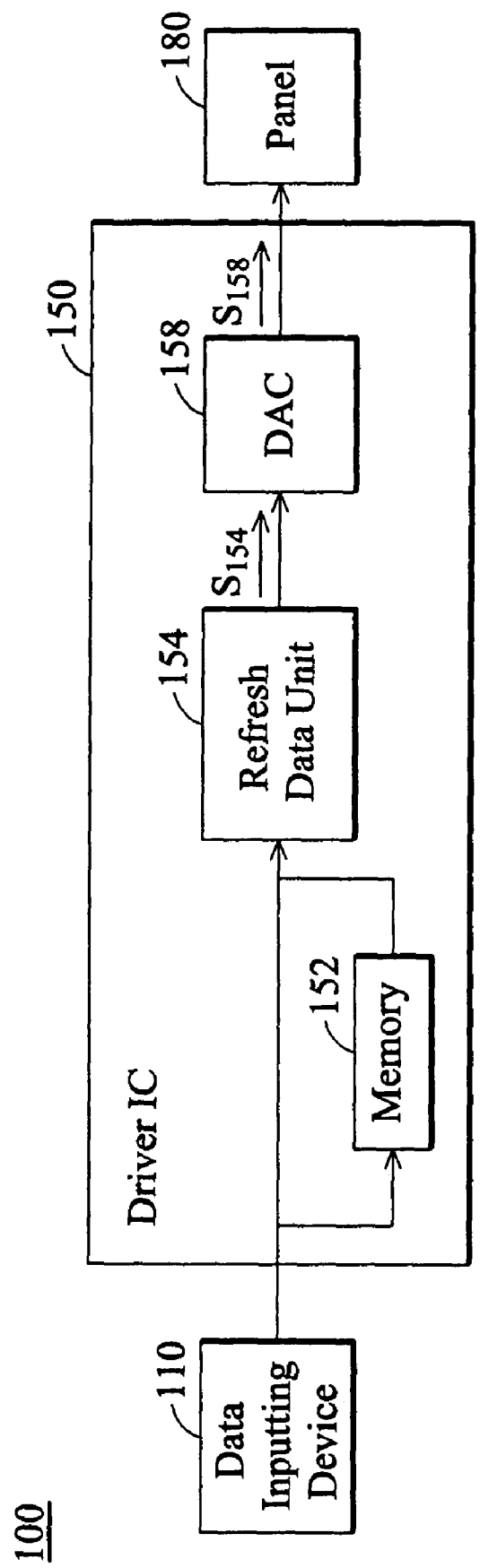
FIG. 1 is a schematic diagram of an image system without recovering.

FIG. 1 is a schematic diagram of an image system 100 without recovering. Image system 100 comprises data inputting device 110, driver IC 150 and panel 180. Panel 180 comprises a LCD panel and a touch panel. The touch panel is disposed on top of the LCD panel. Driver IC 150 comprises memory 152, refresh data unit 154 and digital to analog converter 158 (DAC). Data inputting device 110 directly outputs digital data signals to refresh data unit 154 or indirectly outputs digital data signals through memory 152 to refresh data unit 154. Refresh data unit 154 outputs serial digital signals $S_{154}$ to digital to analog converter 158. Digital to analog converter 158 converts serial digital signals $S_{154}$ into analog data signals $S_{158}$ for the panel 180. Panel 180 receives analog data signals $S_{158}$ to display normal images.

Figure 2:
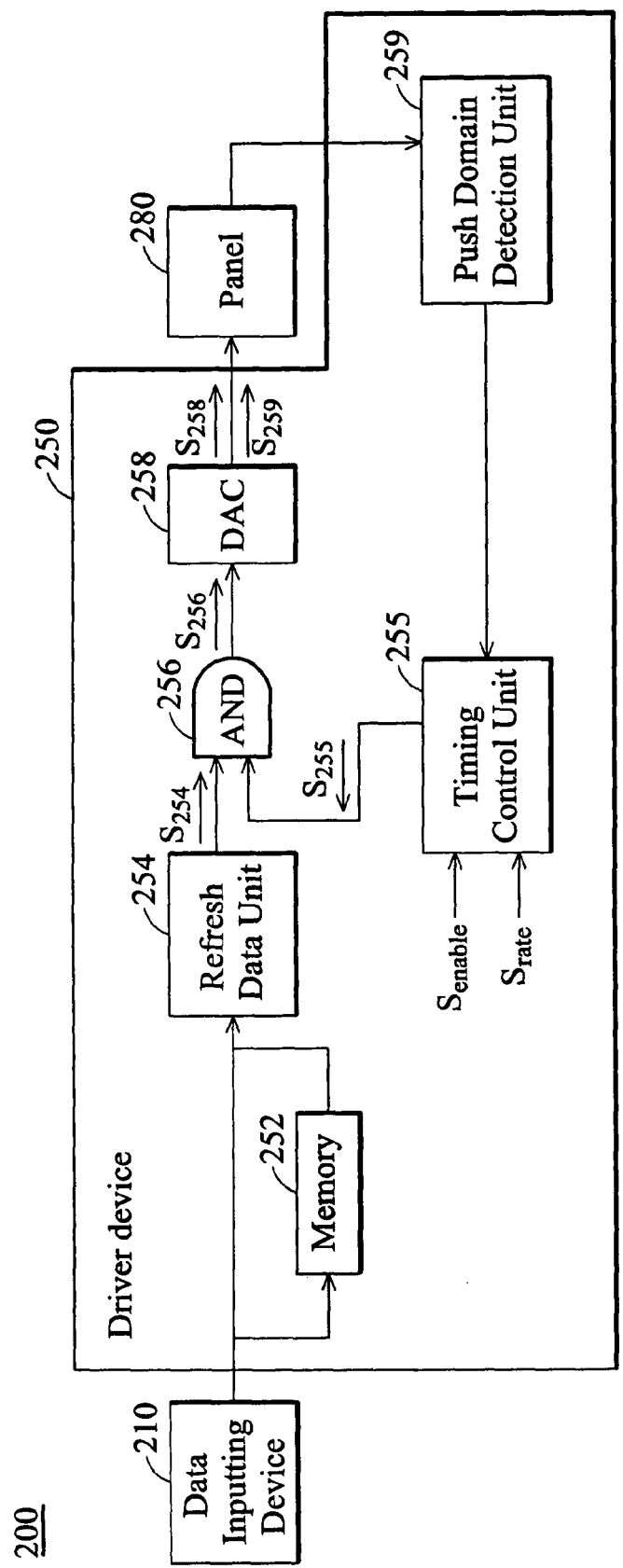
FIG. 2 is a schematic diagram of a recovering image system according to an embodiment of the invention.

FIG. 2 is a schematic diagram of recovering image system 200 according to an embodiment of the invention. Recovering image system 200 comprises data inputting device 210, a driver device 250 and panel 280. The drive device 250 can be a drive IC. Panel 280 can comprise a LCD panel and a touch panel. The touch panel provides signals to represent a push domain area. The touch panel is disposed on top of the LCD panel. Driver IC 250 comprises memory 252, refresh data unit 254, timing control unit 255, AND logic circuit 256, digital to analog converter (DAC) 258 and Push Domain Detection unit 259. Data inputting device 210 directly outputs digital data signals to refresh data unit 254 or indirectly outputs digital data signals through memory 252 to refresh data unit 254. Refresh data unit 254 outputs digital signals to AND logic circuit 256. AND logic circuit 256 receives digital signals $S_{254}$ and timing control signal $S_{255}$ and outputs logic circuit signal $S_{256}$ according to digital signals $S_{254}$ and timing control signal $S_{255}$. Digital to analog converter (DAC) 258 receives logic circuit signal $S_{256}$ from AND logic circuit 256. Digital to analog converter 258 converts logic circuit signal $S_{256}$ into analog data signals $S_{258}$ or reset data signals $S_{259}$ for panel 280. Panel 280 receives analog data signals $S_{258}$ to display normal images when timing control signal $S_{255}$ is disabled. Otherwise, panel 280 receives reset data signals $S_{259}$ to display reset images when timing control signal $S_{255}$ is enabled. In addition, one frame can comprise normal images, reset images or both. The detail is discussed in following embodiments of the invention in FIGS. 3, 4 and 5.

Timing control unit 255 outputs timing control signal $S_{255}$ according to reset enable signal $S_{enable}$ and reset rate signal $S_{rate}$. Reset signal $S_{enable}$ can control driver IC 250 to reset panel 280 or not. Reset rate signal $S_{rate}$ can control the reset rate of panel 280 and is adjustable by another controller (not shown).

According to an embodiment of the invention, if timing control signal $S_{255}$ is low voltage level (logic 0), logic circuit signal $S_{256}$ is low voltage level when digital signals $S_{254}$ is high or low voltage level. When logic circuit signal $S_{256}$ is low voltage level, panel 280 is reset. After resetting panel 280, the panel will show the normal images again. Timing control circuit unit 255 can output timing control signal $S_{255}$ to reset panel 280 at variable reset rates according to reset rate signal $S_{rate}$. During resetting panel 280, panel 280 turns black. The luminance of panel 280 drops according to the reset rate of reset rate signal $S_{rate}$. By selecting an optimum reset rate, a balance can be found between the visibility of the push domain and the luminance loss.

According to another embodiment of the invention, timing control unit 255 can output timing control signal $S_{255}$ to reset the push domain area of panel 280 according to the corresponding push domain control signal. Due to mechanical stress occurring on panel 280, push domain Detection unit 259 can detect the push domain area of panel 280 to generate a corresponding push domain control signal for indicating locations of push domain areas of panel 280. Timing control unit 255 can output timing control signal $S_{255}$ for resetting the push domain area of panel 280 according to the corresponding push domain control signals. Summarily, panel 280 can displays the reset images to restore the push domain areas of the panel. The detail is discussed as following.

For example, panel 280 can be the combination of the MVA (Multi-domain Vertical Alignment) panel and the touch panel. Since the MVA panel has a tendency for showing a domain disturbance for a long period of time after mechanical stress occurs on the touch panel (or MVA panel). According to the above embodiments, timing control circuit unit 255 can output timing control signal $S_{255}$ to reset panel 280 at variable reset rates according to reset rate signal $S_{rate}$. After resetting panel 280, the panel will show the normal images again and the disturbance will not appear on panel 280 for a long period of time. It makes MVA useful for touch panel applications.

Figure 3:
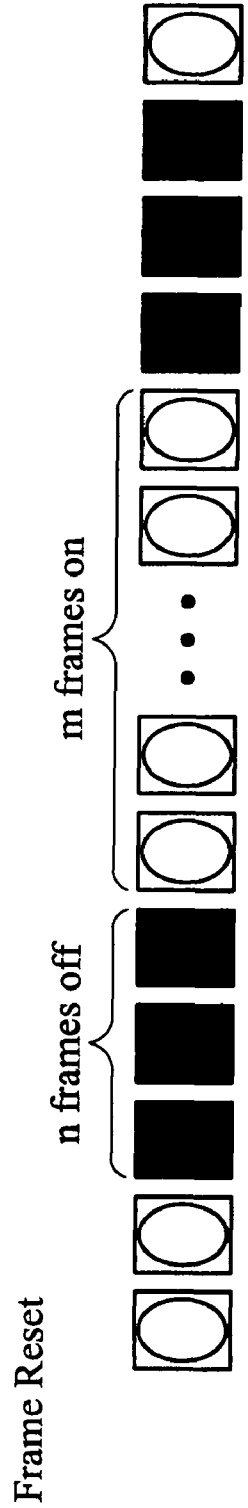
FIG. 3 is a schematic diagram of a panel frame reset according to another embodiment of the invention.

FIG. 3 is a schematic diagram of a panel frame reset according to another embodiment of the invention. Panel 280 displays the reset images for n consecutive frames and the normal images for m consecutive frames. The reset images, as shown in FIG. 3, are blanked, meaning switching off panel 280 to display black images.

Figure 4:
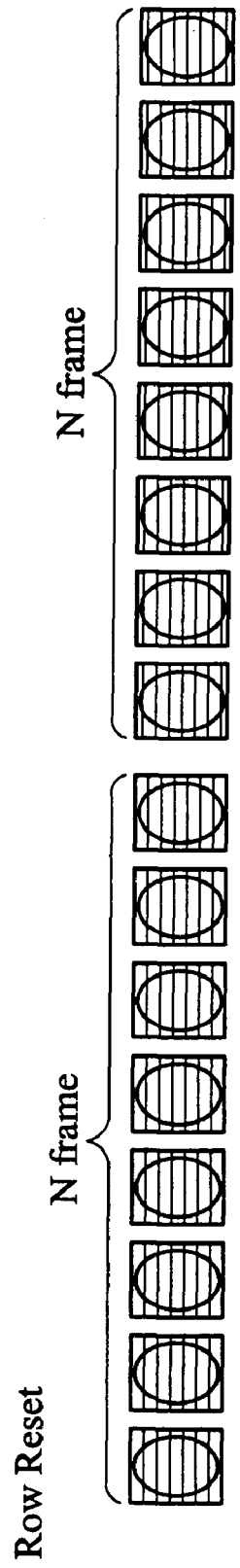
FIG. 4 is a schematic diagram of a panel row reset according to another embodiment of the invention.

FIG. 4 is a schematic diagram of a panel row reset according to another embodiment of the invention. Panel 280 displays reset images at certain rows of one frame for N consecutive frames according to a timing control signal. Next, panel 280 displays the reset images on shifted rows of one frame for next N consecutive frames as shown in FIG. 4. The reset images, meaning to switch off pixels at certain rows of panel 280, will scan all areas of panel 280. In addition, panel 280 comprises a plurality of pixels at different rows and different columns to form a matrix (not shown).

Figure 5:
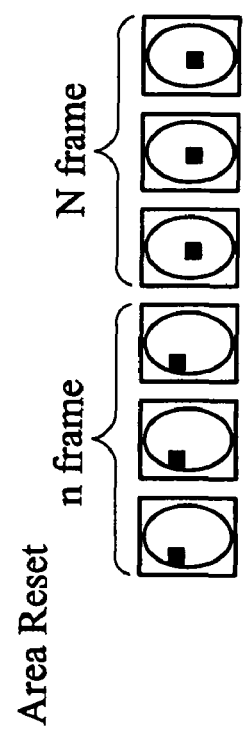
FIG. 5 is a schematic diagram of a panel area reset according to another embodiment of the invention.

FIG. 5 is a schematic diagram of a panel area reset according to another embodiment of the invention. Panel 280 display the reset images at first area of one frame for N consecutive frames. Next, panel 280 displays the reset images at second area of one frame for next N consecutive frames. The reset images, meaning to switch off pixels at certain areas of panel 280, will scan all areas of panel 280.

Figure 6:
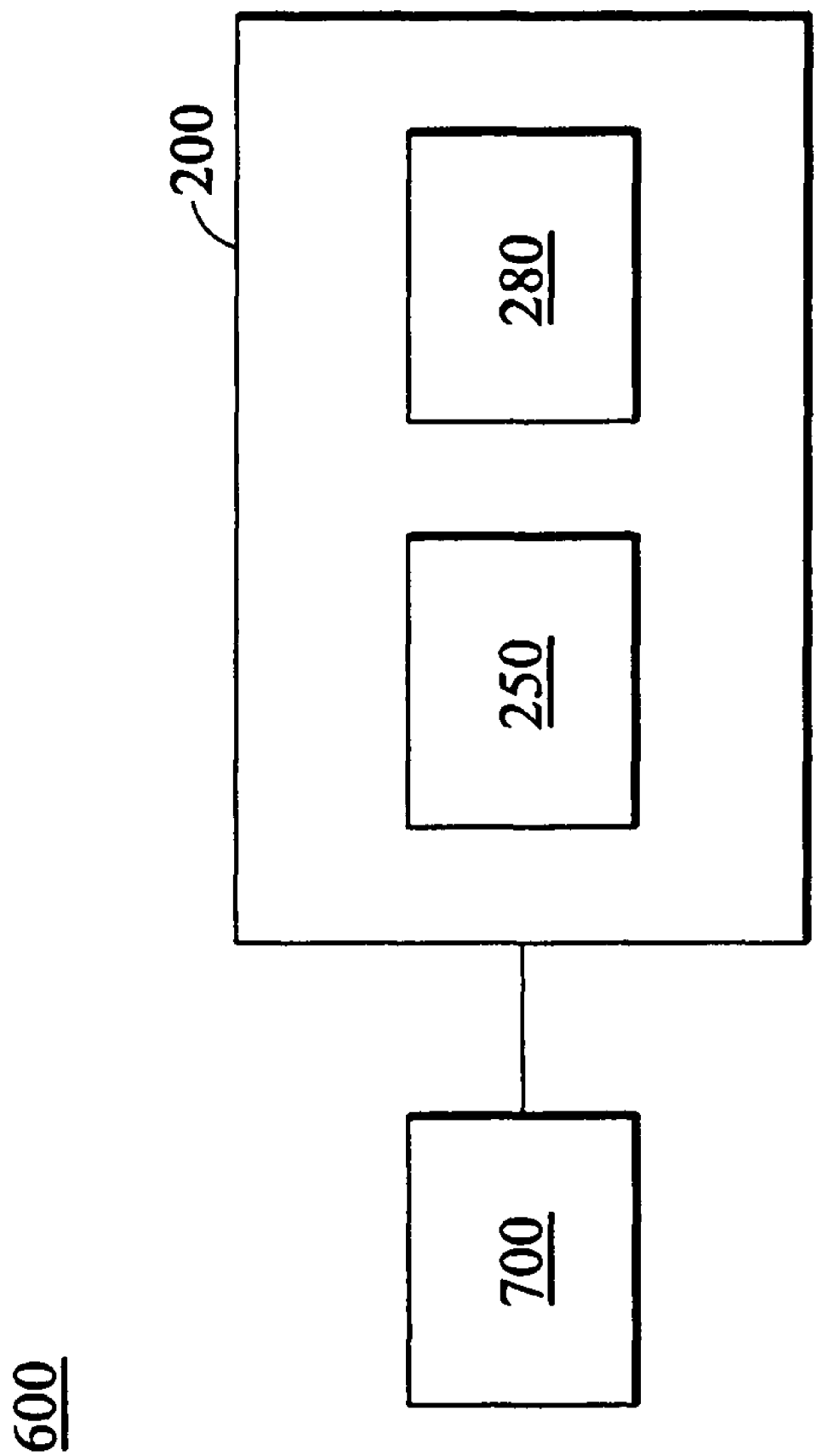
FIG. 6 schematically shows another embodiment of a system for displaying images.

FIG. 6 schematically shows another embodiment of a system for displaying images which, in this case, is implemented as recovering image system 200 or electronic device 600. As shown in FIG. 6, recovering image system 200 comprises a driver IC 250 and panel 280 of FIG. 2. Recovering image system 200 can form a portion of a variety of electronic devices (in this case, electronic device 600). Generally, electronic device 600 can comprise recovering image system 200 and power supply 700. Further, power supply 700 is operatively coupled to recovering image system 200 and provides power to recovering image system 200. Electronic device 600 can be a mobile phone, digital camera, PDA (personal data assistant), notebook computer, desktop computer, television, GPS (global positioning system), automotive display, avionics display or portable DVD player, for example.

While the invention has been described by way of example and in terms of preferred embodiment, it is to be understood that the invention is not limited to thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A recovering image system, comprising:
   a data inputting device outputting digital data signals;
   a driver device receiving the digital data signals, converting the digital data signals into analog data signals, outputting the analog data signals or reset data signals according to timing control signals; and
   a panel receiving the analog data signals or the reset data signals and displaying normal images, reset images or both according to the analog data signals and the reset data signals, wherein the panel comprises a LCD panel and a touch panel, and the touch panel provides signals to represent a push domain area,
   wherein the driver device comprises:
   a refresh data unit receiving the digital data signals from the data inputting device and outputting serial digital signals for refreshing the panel;
   an AND logic circuit receiving the serial digital signals and the timing control signals to output logic circuit signals;
   a timing control unit outputting the timing control signals according to a reset enable signal and a reset rate signal; and
   a digital to analog converter converting the logic circuit signals into the analog data signals or the reset data signals according to the timing control signals,
   wherein when timing control signal is disabled, the panel receives the analog data signals to display normal images, and
   wherein when timing control signal is enabled, the panel receives reset data signals to display reset images.

2. The recovering image system as claimed in claim 1, wherein when the driver device outputs the reset data signals, the panel displays the reset images, and when the driver device outputs the analog data signals, the panel displays the normal images.

3. The recovering image system as claimed in claim 1, wherein a rate of the reset images displayed on the panel is variable according to the reset rate signal.

4. The recovering image system as claimed in claim 1, wherein the panel displays the reset images for n consecutive frames every n+m frames according to the timing control signals and n and m are positive integers.

5. The recovering image system as claimed in claim 1, wherein the panel displays the reset images at certain areas for N frames according to the timing control signals, the reset images scans all areas of the panel and N is a positive integer.

6. The recovering image system as claimed in claim 1, wherein the panel displays the reset images at certain rows of one frame for N frames according to the timing control signals, the reset images scans all areas of the panel and N is a positive integer.

7. The recovering image system as claimed in claim 1, wherein the panel displays the reset images to restore a push domain area of the panel.

8. The recovering image system as claimed in claim 1, wherein the recovering image system forms a portion of an electronic device and the electronic device comprises:

a power supply coupled to and providing power to the recovering image system, wherein the electronic device is a mobile phone, a digital camera, a PDA, a notebook computer, a television, a GPS, an automotive display, an avionics display or a portable DVD player.

9. A recovering image system, comprising:

a data inputting device outputting digital data signals;

a driver device receiving the digital data signals, converting the digital data signals into analog data signals, outputting the analog data signals or reset data signals according to timing control signals;

a panel receiving the analog data signals or the reset data signals and displaying normal images, reset images or both according to the analog data signals and the reset data signals; and a push domain detection unit, wherein the driver device comprises:

- a refresh data unit receiving the digital data signals from the data inputting device and outputting serial digital signals for refreshing the panel;
- an AND logic circuit receiving the serial digital signals and the timing control signals to output logic circuit signals;
- a timing control unit outputting the timing control signals according to a reset enable signal and a reset rate signal; and
- a digital to analog converter converting the logic circuit signals into the analog data signals or the reset data signals according to the timing control signals, wherein the push domain detection unit detects a push domain area of the panel to generate a corresponding push domain control signal to the timing control unit for displaying the reset images on the push domain area of the panel, wherein when timing control signal is disabled, the panel receives the analog data signals to display normal images, and wherein when timing control signal is enabled, the panel receives reset data signals to display reset images.

10. A recovering image system, comprising:

a data inputting device outputting digital data signals;

a driver device, comprising:

- a refresh data unit receiving the digital data signal from the data inputting device and outputting serial digital signals for refreshing the panel;
- an AND logic circuit receiving the serial digital signals and the timing control signals to output logic circuit signals;
- a timing control unit outputting the timing control signals according to a reset enable signal and a reset rate signal; and
- a digital to analog converter converting the logic circuit signals into the analog data signals or the reset data signals according to the timing control signals; and a push domain detection unit, wherein the push domain detection unit detects a push domain area of the panel to generate a corresponding push domain control signal to the timing control unit for displaying the reset images on the push domain area of the panel; and a panel receiving the analog data signals or the reset data signals and displaying normal images, reset images or both according to the analog data signals and the reset data signals, wherein when the driver device outputs the reset data signals when timing control signal is enabled, the panel displays the reset images, and when the driver device outputs the analog data signals when timing control signal is disabled, the panel displays the normal images.

11. The recovering image system as claimed in claim 10, wherein when the driver device outputs the reset data signals, the panel displays the reset images, and when the driver device outputs the analog data signals, the panel displays the normal images.

12. The recovering image system as claimed in claim 10, wherein the rate of the reset images displayed on the panel is variable according to the reset rate signal.

13. The recovering image system as claimed in claim 10, wherein the panel displays the reset images for n consecutive frames every n+m frames according to the timing control signals and n and m are positive integers.

14. The recovering image system as claimed in claim 10, wherein the panel displays the reset images at certain areas for N frames according to the timing control signals, the reset images scans all areas of the panel and N is a positive integer.

15. The recovering image system as claimed in claim 10, wherein the panel displays the reset images at certain rows of one frame for N frames according to the timing control signals, the reset images scans all areas of the panel and N is a positive integer.

16. The recovering image system as claimed in claim 10, wherein the panel displays the reset images to restore a push domain area of the panel and the panel comprises a LCD panel and a touch panel, and the touch panel provides signals to represent the push domain area.

17. The recovering image system as claimed in claim 10, wherein the recovering image system forms a portion of an electronic device and the electronic device comprises:

a power supply coupled to and providing power to the recovering image system, wherein the electronic device is a mobile phone, a digital camera, a PDA, a notebook computer, a television, a GPS, an automotive display, an avionics display or a portable DVD player.

* * * * *